United States Patent
Marri et al.

(10) Patent No.: US 11,994,224 B2
(45) Date of Patent: May 28, 2024

(54) FUSIBLE CAP ADAPTER

(71) Applicant: SAUDI ARABIAN OIL COMPANY, Dhahran (SA)

(72) Inventors: Saleh J. Marri, Abqaiq (SA); Fowzi O. Shammari, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 414 days.

(21) Appl. No.: 17/396,321

(22) Filed: Aug. 6, 2021

(65) Prior Publication Data

US 2023/0039842 A1  Feb. 9, 2023

(51) Int. Cl.
*F16K 17/38* (2006.01)

(52) U.S. Cl.
CPC .................................. *F16K 17/383* (2013.01)

(58) Field of Classification Search
CPC ......... F16K 17/383; E21B 34/16; E21B 34/02
See application file for complete search history.

(56) References Cited

U.S. PATENT DOCUMENTS

| | | | |
|---|---|---|---|
| 1,780,387 A | 11/1930 | Hart | |
| 3,720,220 A | 3/1973 | McMath | |
| 4,421,134 A | 12/1983 | Bruton et al. | |
| 4,553,589 A * | 11/1985 | Jennings | E21B 35/00 137/72 |
| 5,067,510 A | 11/1991 | Breaux et al. | |
| 5,076,313 A | 12/1991 | Bottum, Jr. et al. | |
| 6,227,226 B1 | 5/2001 | Green | |
| 6,866,057 B1 * | 3/2005 | Buehrle, II | F16K 17/383 137/79 |
| 2015/0376986 A1 | 12/2015 | Taylor et al. | |

FOREIGN PATENT DOCUMENTS

CN  109296340 A  2/2019

OTHER PUBLICATIONS

International Search Report and Written Opinion of the International Searching Authority issued in corresponding International Application No. PCT/US2022/039600, mailed Nov. 2, 2022 (14 pages).
"WellGuard Hydraulic Hold Open Tool;" Aug. 5, 2021; pp. 1-2; Retrieved from the Internet: URL: https://www.peakwellsystems.com/products/bespoke-products/wellguard-hydraulic-hold-open-tool.aspx (2 pages).

(Continued)

*Primary Examiner* — P. Macade Nichols
(74) *Attorney, Agent, or Firm* — Osha Bergman Watanabe & Burton LLP

(57) ABSTRACT

A system includes a fusible cap, an adapter, and a hydraulic valve. The fusible cap includes a fusible body having a first box end. The first box end has first box threads. The adapter includes a first pin end and a second box end. The first pin end has first pin threads, and the second box end has second box threads. The hydraulic valve includes a second pin end having second pin threads. The first box threads mate with the first pin threads to form a first connection and the second box threads mate with the second pin threads to form a second connection.

17 Claims, 5 Drawing Sheets

(56) References Cited

OTHER PUBLICATIONS

"Actuators & Surface Safety Valves;" Aug. 5, 2021; pp. 1-51; Retrieved from the Internet: URL: https://www.omnivalve.com/pdf/actuator-brochure-FINAL.pdf (51 pages).
"Fusible Hold-Open Device;" Aug. 5, 2021; pp. 1-3; Retrieved from the Internet: URL: https://www.slb.com/valves/api-spec-6a-technologies/actuator-accessories/fusible-hold open-device (3 pages).
"3X3S Adapter," August 5; 2021; pp. 1-5; Retrieved from the Internet: URL: https://www.girardequip.com/product/3x3s/ (5 pages).

* cited by examiner

FUSIBLE CAP ADAPTER

BACKGROUND

In the oil and gas industry, wells are drilled into the Earth's surface to recover hydrocarbons located in reservoirs. Surface equipment is equipment located at the surface of the Earth and is used to help with the recovery of hydrocarbons. Common pieces of surface equipment include wellheads and trees. Wellheads are used during drilling a well to provide housing for casing strings, provide surface access to the well, and are often connected to Blow-Out Preventors (BOPs). A tree is a serious of spools and valves that is used to access the well, aid in completing the well, and/or produce hydrocarbons. Both trees and wellheads are made of a plurality of valves. The valves may be hydraulically or mechanically actuated.

A hydraulically actuated valve, otherwise known as a hydraulic valve, uses hydraulic fluid to open and close the valve. If the hydraulic line transporting the hydraulic fluid to the hydraulic valve becomes compromised, the valve may unintentionally close while equipment is being used in the well. The unintentional closing of the hydraulic valve may sever wireline or slickline that is being used to convey the equipment. The equipment is then lost to the well and a fishing job must be performed in order to retrieve the equipment and place the well on-line. As such, systems that allow for the hydraulic valve to remain open if there is a hydraulic equipment malfunction yet also allow the hydraulic valve to close if there is an emergency are beneficial.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, a system and a method for forming connections. The system includes a fusible cap, an adapter, and a hydraulic valve. The fusible cap includes a fusible body having a first box end. The first box end has first box threads. The adapter includes a first pin end and a second box end. The first pin end has first pin threads, and the second box end has second box threads. The hydraulic valve includes a second pin end having second pin threads. The first box threads mate with the first pin threads to form a first connection and the second box threads mate with the second pin threads to form a second connection.

The method includes forming a first connection between a fusible cap, having a fusible body, and an adapter by mating first box threads with first pin threads, forming a second connection between the adapter and a hydraulic valve by mating second box threads with second pin threads, disconnecting the fusible cap and the adapter by unthreading the first box threads and the first pin threads, and disconnecting the adapter and the hydraulic valve by unthreading the second box threads and the second pin threads.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
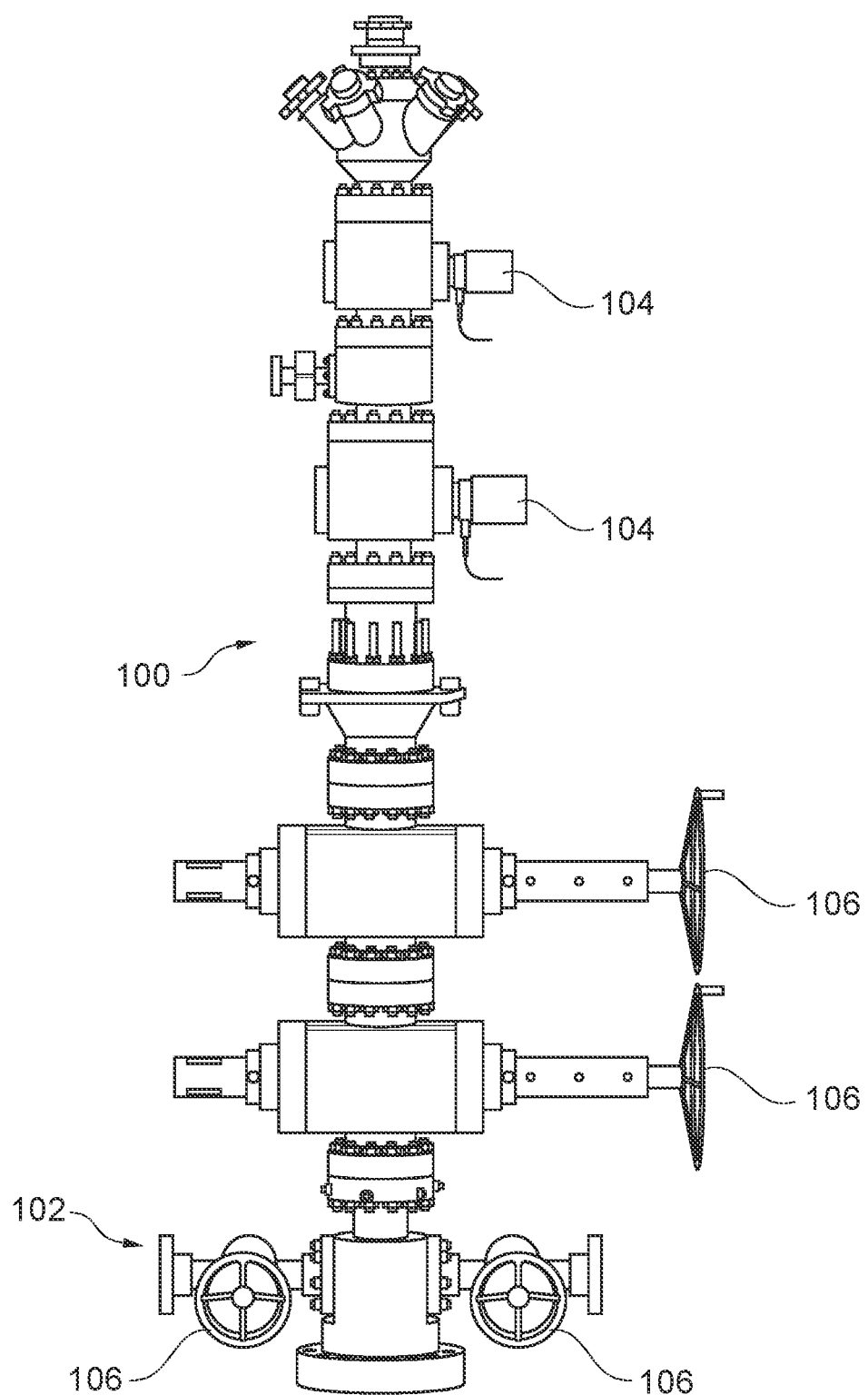
FIG. 1 shows an exemplary tree and wellhead in accordance with one or more embodiments.

FIG. 1 shows an exemplary tree (100) and wellhead (102) in accordance with one or more embodiments. The tree (100) is a series of spools and valves that are used to access a well. The tree (100) may be a completions or frac tree that is used to complete the well with the possibility of using the same tree (100) to produce from the well. Furthermore, the tree (100) may be a production tree placed on the well after the well is ready to be put on production.

The tree (100) is installed on top of a wellhead (102). The wellhead (102) is also a series of spools and valves. The wellhead (102) is used to hang off casing strings and access the well while the well is being drilled. The wellhead (102) and the tree (100) include a plurality of valves that may be hydraulically actuated valves (hydraulic valve (104)) or mechanically actuated valves (mechanical valves (106)).

The type of each of the plurality of valves may be any valve know in the art, such as a gate valve. In the embodiment shown in FIG. 1, the tree (100) includes two hydraulic valves (104) and two mechanical valves (106), and the wellhead (102) includes two mechanical valves (106). A mechanical valve (106) is a valve that is open or closed by a person physically doing so, such as spinning a wheel to open and close a gate valve.

A hydraulic valve (104) is a valve that uses hydraulic fluid to actuate the valve. The hydraulic valve (104) may be designed to stay in a closed position until hydraulic fluid is pumped into the valve mechanisms to open the hydraulic valve (104). A pressure must be continuously applied to the hydraulic fluid to keep the hydraulic valve (104) open. Often times, hydraulic valves (104) are used to provide access to the well during various wellbore operations such as running tools into the well. Tools may be run into the well using wireline or slickline.

When the hydraulic valve (104) closes, it exerts enough pressure to sever the wireline or slickline. In well control situations, the hydraulic valve (104) may intentionally be closed while tools are in the well in order to close in the well and prevent any hydrocarbons from reaching the surface. This, however, is only done in worst case scenarios. During general operations on the well, the hydraulic valves (104) must stay in the open position while tools are in the well to prevent delays in putting the well on production.

If there is a failure in the hydraulic system keeping the hydraulic valve (104) open, the hydraulic valve (104) may automatically close, causing an unintentional severing of the wireline or slickline. Therefore, a device that is able to hold open the hydraulic valve (104) in the case of a failure in the hydraulic system is beneficial. However, such a device must also be able to allow the hydraulic valve (104) to close in a well control scenario. As such, embodiments disclosed herein present systems and methods for keeping a hydraulic valve (104) in the open position unless a well control situation presents.

Figure 2:
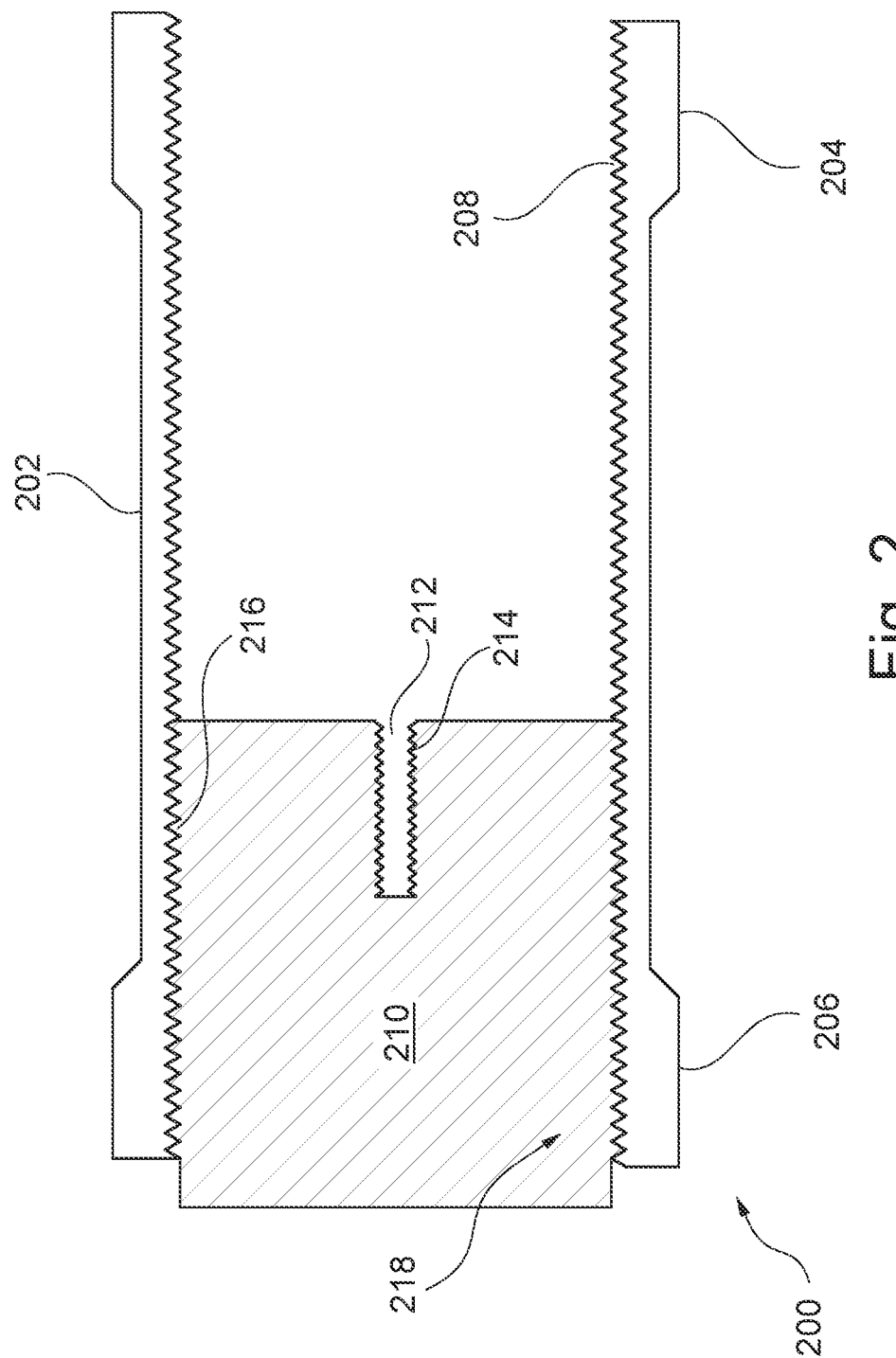
FIG. 2 shows a fusible cap in accordance with one or more embodiments.

The hydraulic valve (104) may be equipped with a fusible cap (200) that is configured to keep the hydraulic valve (104) open during well operations. As such, FIG. 2 shows the fusible cap (200) in accordance with one or more embodiments. The fusible cap (200) is made of a fusible body (202). The fusible body (202) is a tubular body and is made of a material that is configured to melt at a pre-determined temperature. The pre-determined temperature may be the temperature of fire. The fusible body (202) has a first box end (204) on one side of the fusible body (202) and a lateral end (206) opposite the first box end (204) on another side of the fusible body (202).

The fusible body (202) may have an external circumferential surface with tapered-outwards ends on the first box end (204) and the lateral end (206). The first box end (204) has first box threads (208) located on an inner circumferential surface of the fusible body (202). The first box threads (208) may be any type of threads known in the art such as V-shaped threads. The first box threads (208) may extend from the first box end (204) to the lateral end (206) on the inner circumferential surface of the fusible body (202).

The fusible cap (200) may further include a device (210) configured to fit within the fusible body (202). The device (210) is made of the same material as the fusible body (202). The device (210) may be a solid cylinder with an orifice (212) machined into the device (210). The orifice (212) is a hole extending from the inside of the device (210) to the outside of the device (210). The orifice (212) is defined by a circumferential wall having shaft box threads (214). The shaft box threads (214) may be any type of threads known in the art such as V-shaped threads.

The device (210) may have an outer circumferential surface having device threads (216). The device threads (216) may extend the length of the device (210), or the device threads (216) may extend a partial length of the device (210). The device threads (216) may be any type of thread known in the art, but the device threads (216) must be the same type of threads as the first box threads (208).

The device threads (216) are configured to mate with the first box threads (208) to form a third connection (218) between the device (210) and the fusible body (202). The device (210) may be threaded fully or partially within the fusible body (202). FIG. 2 depicts a specific type of fusible cap (200); however, any fusible cap (200) that is configured to melt at a pre-determined temperature and has first box threads (208) on the first box end (204) may be used without departing from the scope of this disclosure herein.

Figure 3:
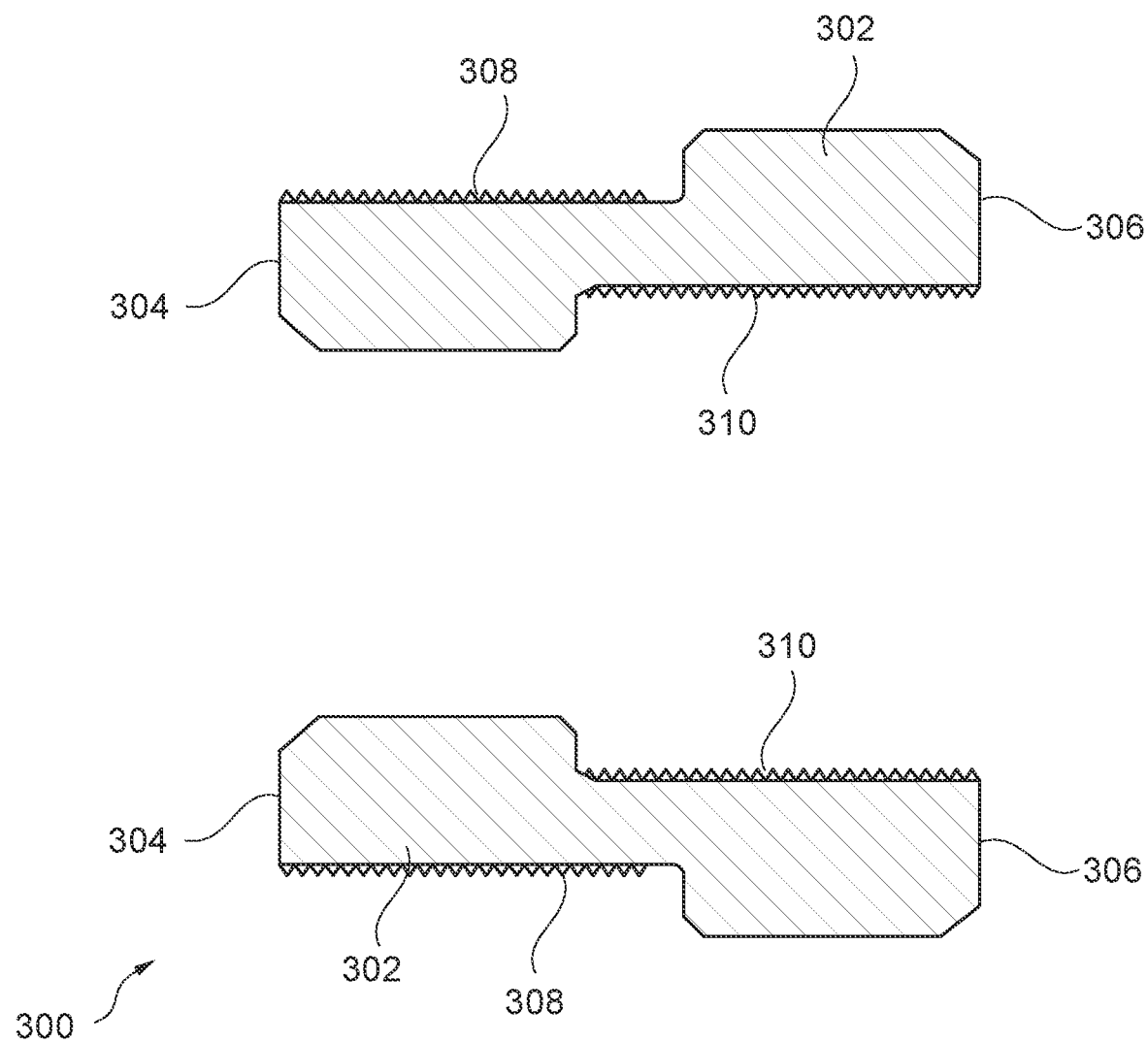
FIG. 3 shows an adapter in accordance with one or more embodiments.

The fusible cap (200) is made to fit specifically for each hydraulic valve (104) pin end. However, in some scenarios, the fusible cap (200) available does not fit the pin end of the hydraulic valve (104). As such, an adapter (300) may be used to install the fusible cap (200) onto the pin end of the hydraulic valve (104). FIG. 3 shows a cross-section of the adapter (300) in accordance with one or more embodiments. The adapter (300) has an adapter body (302). The adapter body (302) is a tubular body, i.e., a cylinder with an empty space cutting through the entirety of the center of the cylinder. The adapter body (302) may be made of any material that can withstand daily use and high temperatures, such as steel. The adapter body (302) has a first pin end (304) and a second box end (306) the first pin end (304) and the second box end (306) are located on opposite sides of the adapter body (302).

The first pin end (304) has an external circumferential surface with first pin threads (308). The first pin threads (308) may extend the length of the external circumferential surface of the first pin end (304) or a partial length. The first pin threads (308) may be any type of threads known in the art, such as V-shaped threads. The first pin end (304) may have an internal circumferential surface that is smooth.

The second box end (306) has an internal circumferential surface that has second box threads (310). The second box threads (310) may extend the length of the internal circumferential surface of the second box end (306) or a partial length. The second box threads (310) may be any type of threads known in the art, such as V-shaped threads. The second box end (306) may have an external circumferential surface that is smooth.

The external circumferential surface of the first pin end (304) and the external circumferential surface of the second box end (306) may not be flush, and the external circumferential surface of the first pin end (304) may be shorter than the external circumferential surface of the second box end (306). The internal circumferential surface of the first pin end (304) and the internal circumferential surface of the second box end (306) may not be flush, and the internal circumferential surface of the first pin end (304) may be taller than the internal circumferential surface of the second box end (306)

In further embodiments, the adapter body (302) may be 2 inches long from the first pin end (304) to the second box end (306). The external circumferential surface of the first pin end (304) may be 1.2 inches long with 1.07 inches covered in the first pin threads (308) and 0.13 inches being smooth. The external circumferential surface of the second box end (306) may be 0.8 inches long. The width of the opening of the first pin end (304) is 1.5 inches. The width of the opening of the second box end (306) is 2.0 inches.

The length of the internal circumferential surface of the second box end (306) is 1.2 inches with all 1.2 inches covered in second box threads (310). The length of the internal circumferential surface of the first pin end (304) is 0.8 inches. The second box threads (310) are 2.0 inch—12

TPI 'V' thread. The first pin threads (308) are 2.75 inch—8 TPI stub ACME pin threads with Major Pitch Diameter=2.74/2.75, Minor Pitch Diameter=2.63/2.64, and nominal height=0.045.

In one or more embodiments, the adapter (300) is a connector cap that successfully connects hydraulic valves (104) to fusible caps (200), where the hydraulic valves (104) and fusible caps (200) are otherwise incompatible.

Figure 4:
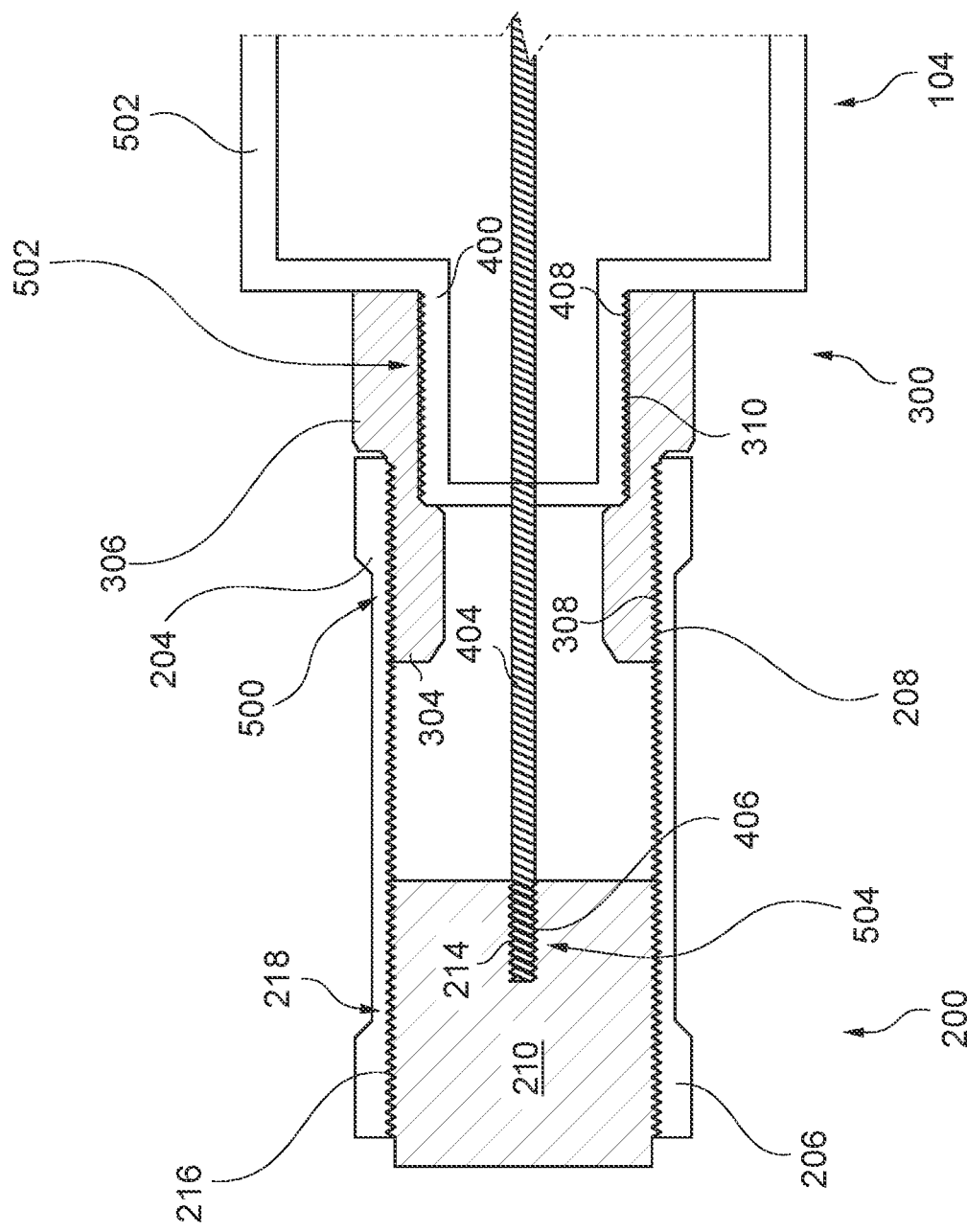
FIG. 4 shows a system in accordance with one or more embodiments.

FIG. 4 shows a system in accordance with one or more embodiments. The system shows an overall connection formed between a fusible cap (200) and a hydraulic valve (104) that are directly incompatible. An adapter (300) is configured to form an overall connection between the two incompatible components. The system includes the fusible cap (200) as described in FIG. 2, the adapter (300) as described in FIG. 3, and the hydraulic valve (104) as described in FIG. 1. Elements that are the same or similar to elements described in FIGS. 1-5 have not been re-described for purposes of readability.

The adapter (300) is utilized to connect the fusible cap (200) to the hydraulic valve (104). The adapter (300) is used to connected fusible caps (200) that may be designed for different hydraulic valves (104) in that, without the adapter (300), the fusible caps (200) would be unmateable with the hydraulic valve (104). This allows for fusible caps (200) to be interchangeable between differently designed hydraulic valves (104).

The hydraulic valve (104) may be located on a tree (100), or a wellhead (102) as described in FIG. 1. The hydraulic valve (104) may be any type of hydraulic valve (104) that has a second pin end (400). The hydraulic valve (104) is made of a valve body (402) that may be made out of any material, such as steel. The hydraulic valve has a shaft (404). The shaft (404) is movable within the valve body (402) and has an open position and a closed position.

The open position is defined by the shaft (404) extending laterally outwardly from the valve body (402). The closed position is defined by the shaft (404) being completely within the valve body (402) or jutting out a little bit from the valve body (402). The shaft (404) has shaft pin threads (406) located on an external circumferential of the shaft (404). The shaft pin threads (406) begin on the side of the shaft (404) furthest away from the hydraulic valve (104). The shaft pin threads (406) may extend completely or partially along the shaft (404). The valve body (402) has a second pin end (400) with an external circumferential surface having second pin threads (408).

The fusible cap (200) is connected to the adapter (300) by a first connection (500). The adapter (300) is connected to the hydraulic valve (104) by a second connection (502). The device (210) is connected to the fusible cap (200) by a third connection (218). The shaft (404) of the hydraulic valve (104) is connected to the device (210) by a fourth connection (504).

The first box threads (208) mate with the first pin threads (308) to form the first connection (500). The second box threads (310) mate with the second pin threads (408) to form the second connection (502). The device threads (216) mate with the first box threads (208) to form the third connection (218). The shaft pin threads (406) mate with the shaft box threads (214) to form the fourth connection (504). The fourth connection (504) is formed to hold the shaft (404) in the open position, thus keeping the hydraulic valve (104) in the open position.

The material of the device (210) and the fusible body (202) are configured to melt at a pre-determined temperature which is a temperature that is lower than the temperature that would melt the rest of the system. When the device (210) and the fusible body (202) melts, the fourth connection (504) is broken, and the shaft (404) may be able to return to the closed position. Further, the fourth connection (504) may be broken by unscrewing/un-mating the device (210) from the fusible body (202).

Figure 5:
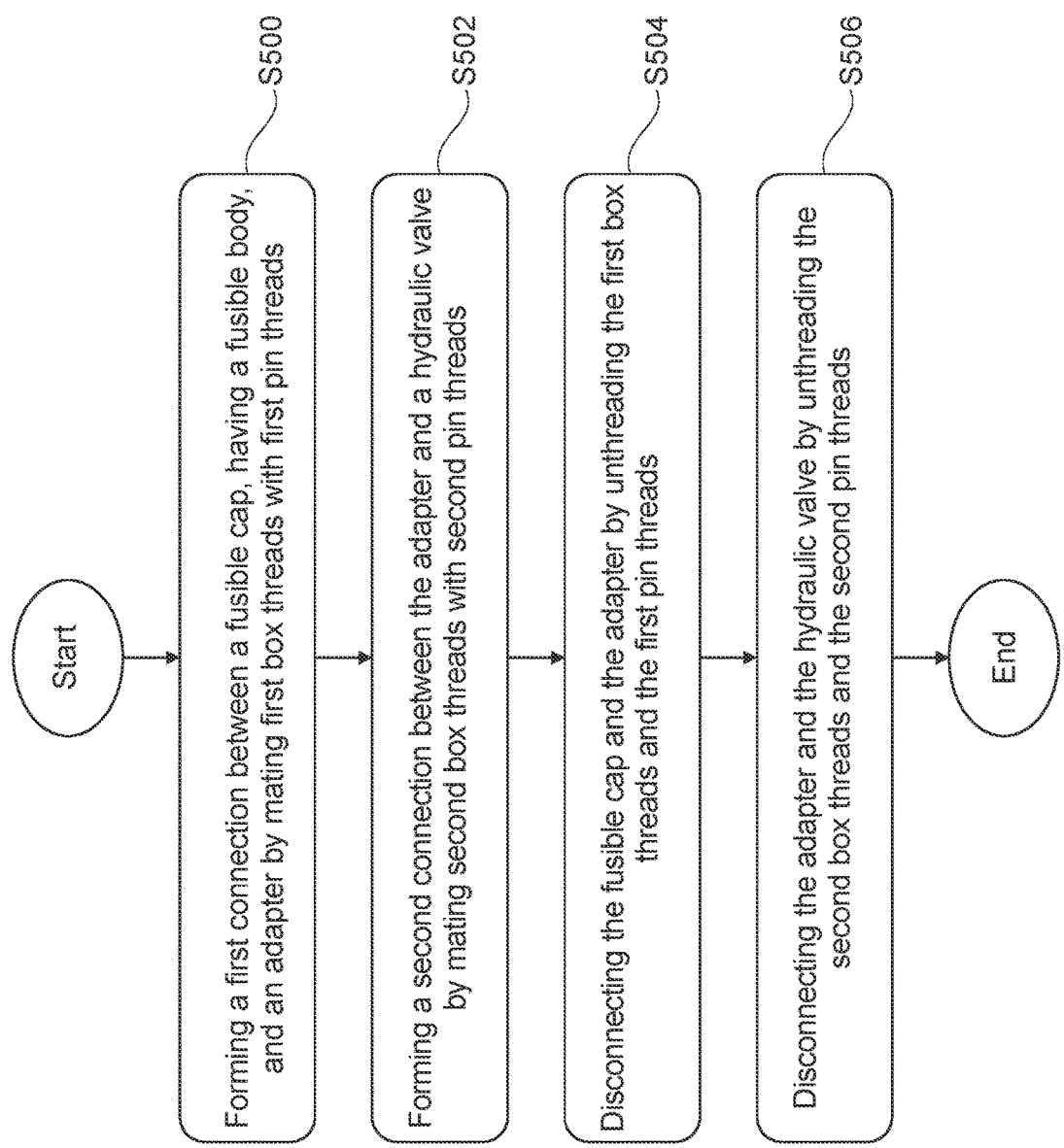
FIG. 5 shows a flowchart in accordance with one or more embodiments.

FIG. 5 depicts a flowchart in accordance with one or more embodiments. More specifically, FIG. 5 illustrates a method for forming and disconnecting a system that may hold open a hydraulic valve (104). Further, one or more blocks in FIG. 5 may be performed by one or more components as described in FIGS. 1-4. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a first connection (500) is formed between a fusible cap (200), having a fusible body (202), and an adapter (300) by mating first box threads (208) with first pin threads (308) (S500). The fusible body (202) is made out of a material that is designed to melt when a pre-determined temperature is reached. The first box threads (208) are located on a first box end (204) of the fusible body (202). The first pin threads (308) are located on the first pin end (304) of the adapter (300).

A second connection (502) is formed between the adapter (300) and a hydraulic valve (104) by mating second box threads (310) with second pin threads (408) (S502). The second box threads (310) are located on a second box end (306) of the adapter (300). The second pin threads (408) are located on the second pin end (400) of the hydraulic valve (104). The adapter (300) and the hydraulic valve (104) are made out of a material that can withstand high temperatures that the fusible cap (200) may not withstand.

The first box threads (208) may extend from the first box end (204) of the fusible body (202) to a lateral end (206) of the fusible body (202). The lateral end (206) is located opposite the first box end (204). A third connection (218) is formed between a device (210) and the fusible cap (200) by mating device threads (216) with the first box threads (208). The device threads (216) are located on an external circumferential surface of the device (210). The device (210) may be made out of the same material as the fusible body (202).

The hydraulic valve (104) may be made out of a valve body (402) and a shaft (404). The shaft (404) is placed in the open position. The shaft (404) may have shaft pin threads (406) that are located on an external circumferential surface of the shaft (404). A fourth connection (504) is formed between the shaft (404) and an orifice (212) located within the device (210) by mating shaft box threads (214) with shaft pin threads (406).

The shaft box threads (214) are located on an inner circumferential wall of the orifice (212). The fourth connection (504) may be formed by adjusting the third connection (218) to have the orifice (212) be screwed over the shaft (404). The fourth connection (504) holds the shaft (404) in the open position, thus holding the hydraulic valve (104) open for normal operation of the well.

When the operation is over and the well needs to be shut in or another operation needs to begin, the fusible cap (200) must be removed from the hydraulic valve (104) to allow the hydraulic valve (104) to properly operate and close. The fusible cap (200) and the adapter (300) are disconnected by unthreading the first box threads (208) and the first pin threads (308) (S504). The adapter (300) and the hydraulic valve (104) are disconnected by unthreading the second box threads (310) and the second pin threads (408) (S506). The fourth connection may be disconnected by melting the fusible body (202) and the device (210) using fire or unthreading the shaft box threads (214) from the shaft pin threads (406). When the fourth connection (504) is disconnected, the shaft (404) may be placed in the closed position. The third connection (218) may be disconnected by unthreading the device threads (216) and the first box threads (208).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A system comprising:
a fusible cap comprising a fusible body having a first box end, wherein the first box end has first box threads;
an adapter comprising a first pin end and a second box end, wherein the first pin end has first pin threads, and the second box end has second box threads; and
a hydraulic valve comprising a second pin end having second pin threads,
wherein the first box threads mate with the first pin threads to form a first connection and the second box threads mate with the second pin threads to form a second connection,
wherein the fusible cap and the hydraulic valve are incompatible, and the adapter is configured to form an overall connection between the two incompatible components, and
wherein the first box threads laterally extend from the first box end to a lateral end opposite the first box end of the fusible cap.

2. The system of claim 1, further comprising:
a device comprising device threads, wherein a third connection is formed by mating the device threads with the first box threads.

3. The system of claim 2,
wherein the device further comprises an orifice defined by a circumferential wall having shaft box threads.

4. The system of claim 3, further comprising:
a shaft movable within the hydraulic valve, comprising shaft pin threads, and having an open position and a closed position.

5. The system of claim 4,
wherein a fourth connection is formed by mating the shaft pin threads with the shaft box threads.

6. The system of claim 5,
wherein the fourth connection is formed when the shaft is in the open position and the fourth connection holds the shaft in the open position.

7. The system of claim 6,
wherein the device and the fusible body are made of a material designed to melt at a pre-determined temperature.

8. The system of claim 7,
wherein the fourth connection is broken when the device and the fusible body reach the pre-determined temperature or when the shaft box threads are unthreaded from the shaft pin threads.

9. A method comprising:
forming a first connection between a fusible cap, having a fusible body, and an adapter by mating first box threads with first pin threads;
forming a second connection between the adapter and a hydraulic valve by mating second box threads with second pin threads;
disconnecting the fusible cap and the adapter by unthreading the first box threads and the first pin threads;
disconnecting the adapter and the hydraulic valve by unthreading the second box threads and the second pin threads, and
forming a third connection between a device and the fusible cap by mating device threads with the first box threads.

10. The method of claim 9, further comprising:
forming a fourth connection between a shaft and an orifice, located within the device, by mating shaft box threads with shaft pin threads.

11. The method of claim 10,
wherein the shaft is movable within the hydraulic valve to have an open position and a closed position.

12. The method of claim 11,
wherein forming the fourth connection further comprises placing the shaft in the open position.

13. The method of claim 12,
wherein forming the fourth connection further comprises adjusting the third connection.

14. The method of claim 13, further comprising:
holding the shaft in the open position using the fourth connection.

15. The method of claim 14, further comprising:
disconnecting the fourth connection by melting the fusible body and the device or unthreading the shaft box threads from the shaft pin threads.

16. The method of claim 15, further comprising:
placing the shaft in the closed position.

17. The method of claim 16, further comprising:
disconnecting the third connection by unthreading the device threads and the first box threads.

* * * * *